US005830581A

United States Patent [19]

Masuda et al.

[11] Patent Number: 5,830,581

[45] Date of Patent: Nov. 3, 1998

[54] METHOD FOR FORMATION OF COATING FILM

[75] Inventors: Yutaka Masuda, Fujisawa; Akimasa Nakahata; Yoshiyuki Yukawa, both of Hiratsuka; Motoshi Yabuta, Hadano, all of Japan

[73] Assignee: Kansai Paint Co., Ltd., Japan

[21] Appl. No.: 843,595

[22] Filed: Apr. 16, 1997

[30] Foreign Application Priority Data

Apr. 17, 1996 [JP] Japan .................................... 8-118223

[51] Int. Cl.[6] ................................ B32B 15/08; B05D 3/02

[52] U.S. Cl. ....................... 428/463; 427/386.1; 427/409; 428/461; 428/500; 428/522

[58] Field of Search ................................ 427/404, 386.1; 428/461; 426/463, 500, 522

[56] References Cited

U.S. PATENT DOCUMENTS

| | | | |
|---|---|---|---|
| 5,389,406 | 2/1995 | Doebler et al. | 427/409 |
| 5,395,659 | 3/1995 | Gräf et al. | 427/409 |
| 5,552,227 | 9/1996 | Göldner | 427/409 |

OTHER PUBLICATIONS

WPI Abstract Accession No. 93–365438/46 (abstract of JP 050271580). No date.

WPI Abstract Accession No. 91–027007/04 (abstract of JP 020298384). No date.

*Primary Examiner*—Janyce Bell
*Attorney, Agent, or Firm*—Wenderoth, Lind & Ponack

[57] ABSTRACT

The present invention provides a method for forming a multi-layer coating film by applying a colored clear coating (B) containing a color pigment and/or a glittering material, on the film of a leafing type aluminum flake-containing metallic coating (A), wherein the colored clear coating (B) also contains a polymer formed from an unsaturated monomer having a phosphoric acid group represented by —O—PO(OH)($R_1$) (wherein $R_1$ is a hydroxyl group, a phenyl group or a $C_{1-20}$ alkyl group) and a hydroxyl group-containing unsaturated monomer.

The method can form a multi-layer coating film improved in interlayer adhesivity between the metallic coating film and the colored clear coating film, without reducing the excellent effects and metallic feeling provided by a metallic coating film containing leafing type aluminum flake.

15 Claims, No Drawings

METHOD FOR FORMATION OF COATING FILM

BACKGROUND OF THE INVENTION

1. Field of the Invention

The present invention relates to a method for formation of a multi-layer coating film comprising a leafing type aluminum flake-containing metallic film and a colored clear film, which multi-layer coating film has improved interlayer adhesivity.

2. Description of Related Art

A technique is known which comprises forming, on a substrate (e.g. a body panel of automobile), a multi-layer coating film by applying an aluminum flake-containing metallic coating on the substrate and then applying thereon a colored clear coating.

The aluminum flake pigment contained in a metallic coating is classified into a leafing type and a non-leafing type, depending upon the properties. The leafing type aluminum flake can easily form a continuous aluminum plane by floating onto the film of the metallic coating (this floating is called as leafing) and making substantially parallel orientation, and has unique properties of giving a coating film surface of high density, strong brightness and flip-flop feeling and chrome plating-like finish. Therefore, by applying a colored clear coating on said coating film surface, the final film surface can have a candy tone superior in brightness and flip-flop feeling. However, when a colored clear coating is applied, on a wet-on-wet basis, onto the uncured film of a metallic coating containing leafing type aluminum flake, the orientation of aluminum flake becomes irregular inviting deterioration of chrome plating-like finish (this deterioration is mottling after clear coat); when a colored clear coating is applied onto the cured film of a metallic coating containing leafing type aluminum flake, the interlayer adhesivity between the metallic coating film and the colored clear coating film is not sufficient; thus, in any of the above cases, it has been impossible to fully utilize the above-mentioned properties of leafing type aluminum flake.

Meanwhile, non-leafing type aluminum flake is dispersed in a metallic coating film without causing leafing. Therefore, when a colored clear coating is applied onto the film of a metallic coating containing non-leafing type aluminum flake, reduction in interlayer adhesivity, metallic feeling or the like is very small as compared with the above case where a colored clear coating is applied onto the film of a metallic coating containing leafing type aluminum flake; however, it is difficult to obtain a metallic coating film of strong brightness and flip-flop feeling and excellent chrome plating-like finish.

In view of the above situation, the present inventors made a study on improvement of the interlayer adhesivity between (1) the film of a metallic coating containing leafing type aluminum flake and (2) the film of a colored clear coating, without reduction in the above-mentioned unique properties (e.g. high density, strong brightness and flip-flop feeling and chrome plating-like finish) and metallic feeling possessed by the metallic coating film (1). As a result, the present inventors found out that the above improvement is made possible by curing the metallic coating film (1) and applying thereon a colored clear coating comprising a particular polymer, i.e. a phosphoric acid group- and hydroxyl group-containing polymer. The present invention has been completed based on the finding.

SUMMARY OF THE INVENTION

According to the present invention, there is provided a method for forming a multi-layer coating film by applying a colored clear coating (B) containing a color pigment and/or a glittering material, on the film of a leafing type aluminum flake-containing metallic coating (A), wherein the colored clear coating (B) also contains a polymer formed from an unsaturated monomer having a phosphoric acid group represented by —O—PO(OH)($R_1$) (wherein $R_1$ is a hydroxyl group, a phenyl group or a $C_{1-20}$ alkyl group) and a hydroxyl group-containing unsaturated monomer.

DETAILED DESCRIPTION OF THE PREFERRED EMBODIMENTS

The metallic coating (A) used in the method of the present invention for formation of a multi-layer coating film (the method is hereinafter referred to as the present method) is usually a liquid coating comprising a vehicle component and a leafing type aluminum flake metallic pigment.

The vehicle component can be a per se known vehicle for metallic coating, for example, a vehicle comprising a resin having a crosslinkable functional group (e.g. a hydroxyl group) and a crosslinking agent. The crosslinkable functional group-containing resin includes an acrylic resin, a polyester resin, an alkyd resin, etc. all having two or more hydroxyl groups in the molecule. Of these resins, a hydroxyl group-containing acrylic resin is particularly preferred. Suitable as the crosslinking agent is a melamine resin reactive with said crosslinkable functional group. A preferable specific example thereof is a partially or fully etherified melamine resin having 1–5 triazine rings, obtained by etherifying part or the whole of the methylol groups of methylolmelamine with a monohydric alcohol having 1–8 carbon atoms. An imino group-containing melamine resin or a blocked or unblocked polyisocyanate compound can also be used as the crosslinking agent. The appropriate amount ratio of the crosslinkable functional group-containing resin and the crosslinking agent used is such that the former is 50–90% by weight, particularly 65–80% by weight based on the total of the solid contents of the two components and the latter is 50–10% by weight, particularly 45–20% by weight.

The leafing type aluminum flake pigment used in the metallic coating (A) is preferably an aluminum flake produced by milling aluminum mechanically using an auxiliary agent (e.g. stearic acid). It appropriately has a lengthwise direction size of 2–50 $\mu$m and a thickness of 0.1–2 $\mu$m. The metallic coating (A) containing such a leafing type aluminum flake metallic pigment can form a metallic coating film having a high density, strong brightness and flip-flop feeling and chrome plating-like finish.

The metallic coating (A) can be produced by dissolving or dispersing the above components in an organic solvent. The metallic coating (A) can further comprise, as necessary, a color pigment, an extender pigment, an antisettling agent, an ultraviolet absorber, a catalyst, etc.

The metallic coating (A) can be applied, by electrostatic coating, spray coating or the like, onto a substrate (e.g. a body panel of automobile) obtained by applying a primer (e.g. a cationic electrocoating) onto a metallic or a plastic sheet, curing the resulting primer film, as necessary applying an intermediate coating, and as necessary curing the resulting intermediate coating film. Application of the metallic coating (A) on the uncured intermediate coating film on wet-on-wet basis and subsequent simultaneous curing of the intermediate coating film and the metallic coating (A) film is effective because it can shorten the application step. The appropriate thickness of the metallic coating (A) film is generally 1–20 $\mu$m, particularly 2–10 $\mu$m as cured. The metallic coating (A) film can be cured by heating it at a temperature of about 100°–180° C. for about 10–40 minutes.

The feature of the present method is to apply, onto the cured film of the metallic coating (A), a colored clear coating (B) which contains a color pigment and/or a glittering material and a polymer formed from an unsaturated monomer having a phosphoric acid group represented by —O—PO(OH)($R_1$) (wherein $R_1$ is a hydroxyl group, a phenyl group or a $C_{1-20}$ alkyl group) and a hydroxyl group-containing unsaturated monomer (the polymer is hereinafter referred to as P-polymer) and which can form a clear coating film through which the metallic feeling of the metallic coating (A) film can be seen.

The color pigment usable in the colored clear coating (B) can be an ordinary organic or inorganic pigment for coating. It includes, for example, titanium white, carbon black, Chrome Vermilion, Permanent Red, Perylene Vermilion, Titan Yellow, antimony yellow, azo type pigments, threne type pigments, chrome green, Cyanine Green, ultramarine, Cyanine Blue, cobalt violet and quinacridone violet. The glittering material can be a flake pigment capable of endowing a coating film with a metallic feeling and a light iridescent action. Specific examples thereof include flakes of metals such as aluminum, stainless steel, brass and the like; mica; mica-like iron oxide; titanium oxide-coated mica; and iron oxide-coated mica. These color pigments and glittering materials can respectively be used singly or in admixture of two or more. The color pigment and the glittering material can be used each in such an amount that the resulting coating (B) film can have a transparency that the surface of the metallic coating (A) film can be clearly seen through the coating (B) film with naked eyes. For example, the color pigment can be used in an amount of generally 0.5–5 parts by weight, particularly 1–3 parts by weight per 100 parts by weight of the resin solid content although the amount differs depending upon the hiding power, and the glittering material can be used in an amount of generally 0.1–5 parts by weight, particularly 0.5–2 parts by weight on the same basis.

The phosphoric acid group-containing unsaturated monomer used in production of the P-polymer contained in the colored clear coating (B), is a compound having, in the molecule, a phosphoric acid group represented by the following formula:

$$—O—PO(OH)(R_1)$$

(wherein $R_1$ is a hydroxyl group, a phenyl group or an alkyl group having 1–20, particularly 2–10 carbon atoms) and a polymerizable unsaturated bond. The monomer includes, for example, acid-phosphoxy-$C_{1-20}$ alkyl (meth)acrylates such as acid-phosphoxyethyl acrylate, acid-phosphoxyethyl methacrylate, acid-phosphoxypropyl acrylate, acid-phosphoxypropyl methacrylate and the like; and equimolar adducts between glycidyl (meth)acrylate and mono-$C_{1-20}$ alkyl phosphate. An acid-phosphoxy-$C_{2-10}$ alkyl (meth) acrylate is particularly preferred. The hydroxyl group-containing unsaturated monomer is a compound having, in the molecule, a hydroxyl group and a polymerizable unsaturated bond. The monomer includes, for example, $C_{2-20}$, particularly $C_{2-10}$ hydroxyalkyl (meth)acrylates such as hydroxyethyl (meth)acrylate, hydroxypropyl (meth) acrylate, hydroxybutyl (meth)acrylate and the like. The hydroxyl group-containing unsaturated monomer further includes PLACCELs FA-1, FA-2, FA-3, FA-4, FA-5, FM-1, FM-2, FM-3, FM-4, FM-5 and FM-6 (trade names and products of Daicel Chemical Industries, Ltd.), which are each an ester of the above-mentioned hydroxyalkyl (meth) acrylate and caprolactone.

The P-polymer can be produced by copolymerizing the phosphoric acid group-containing unsaturated monomer, the hydroxyl group-containing unsaturated monomer and, as necessary, an N-alkoxymethylamide group-containing unsaturated monomer and/or other unsaturated monomer.

The N-alkoxymethylamide group-containing unsaturated monomer is a compound having an N-alkoxymethylamide group and a polymerizable unsaturated bond in the molecule. It includes, for example, N—$C_{1-6}$ alkoxymethyl (meth)acrylamides such as N-methoxymethyl-(meth) acrylamide, N-ethoxymethyl(meth)acrylamide, N-butoxymethyl(meth)acrylamide, N-propoxymethyl(meth) -acrylamide and the like. The other unsaturated monomer includes, for example, $C_{1-22}$ alkyl (meth)acrylates such as methyl (meth)acrylate, ethyl (meth)acrylate, propyl (meth) acrylate, butyl (meth)acrylate and the like; vinyl aromatic compounds such as styrene, vinyltoluene and the like; vinyl monomers such as acrylonitrile, vinyl acetate, vinyl chloride and the like; olefins such as ethylene, propylene and the like; and carboxyl group-containing unsaturated compounds such as (meth)acrylic acid, maleic acid, maleic anhydride and the like.

In the P-polymer, the preferable amount ratio of the phosphoric acid group-containing monomer and the hydroxyl group-containing monomer is generally such that the former is 1–50% by weight, particularly 5–30% by weight based on the total monomers constituting the P-polymer and the latter is 1–50% by weight, particularly 5–30% by weight based on the total monomers constituting the P-polymer. The appropriate amount of the N-alkoxymethylamide group-containing unsaturated monomer is generally 30% by weight or less, particularly 1–20% by weight based on the total monomers constituting the P-polymer. The remainder is the other unsaturated monomer. The copolymerization of these monomers is preferably conducted by solution polymerization. The resulting P-polymer preferably has a hydroxyl value of generally 5–150 mg KOH/g, particularly 10–120 mg KOH/g, more particularly 30–110 mg KOH/g; an acid value based on the phosphoric acid group, of generally 10–150 mg KOH/g, particularly 20–130 mg KOH/g; and a number-average molecular weight of 1,000–100,000, particularly 3,000–50, 000, more particularly 5,000–30,000.

A P-polymer free from any N-alkoxymethylamide group-containing monomer unit has no self-crosslinkability or self-curability but, when used in combination with an N-alkoxymethylamide group-containing monomer, can be subjected to crosslinking. When in the coating (B), a P-polymer free from any N-alkoxymethylamide group-containing monomer unit is used in combination with a polymer having N-alkoxymethylamide group-containing monomer units (this polymer acts as a crosslinking agent), the resulting coating (B) has crosslinkability.

The colored clear coating (B) can be produced by dissolving or dispersing, in an organic solvent, the color pigment and/or the glittering material, the P-polymer and, optionally, the N-alkoxymethylamide group-containing monomer or a polymer containing units of the monomer. In this case, it is possible to add other ordinary resin for coating, an ultraviolet absorber, etc. as necessary. The colored clear coating (B) can contain the P-polymer in an amount (as solid content) of generally 20–80% by weight, preferably 30–60% by weight, more preferably 40–50% by weight. The coating (B) appropriately has a solid content of generally about 10–80% by weight, particularly about 20–60% by weight when applied.

The other ordinary resin for coating, which may be contained in the colored clear coating (B), includes, for example, an acrylic resin, a polyester resin, an alkyd resin, a fluororesin, a urethane resin and a silicon-containing resin, all having a crosslinkable functional group such as hydroxyl group, carboxyl group, silanol group, epoxy group or the like. Of these, a crosslinkable functional group-containing acrylic resin is preferred. Any of these crosslinkable functional group-containing resins may be used in combination with a crosslinking agent reactive with the functional group of said resin, such as melamine resin, urea resin, blocked or unblocked polyisocyanate compound, epoxy compound or resin, carboxyl group-containing compound or resin, acid anhydride, alkoxysilane group-containing compound or resin, or the like. As the melamine resin, there is preferably used a partially or fully etherified melamine resin having 1–5 triazine rings, obtained by etherifying part or the whole of the methylol groups of methylolmelamine with a monohydric alcohol having 1–8 carbon atoms. An imino group-containing melamine resin can also be used as the crosslinking agent. In the other ordinary resin for coating, the appropriate amount ratio of the crosslinkable functional group-containing resin and the crosslinking agent used is such that the former is 50–90% by weight, particularly 65–80% by weight based on the total of the solid contents of the two components and the latter is 50–10% by weight, particularly 35–20% by weight.

The amount ratio of the P-polymer and the other ordinary resin for coating can be determined as desired depending upon the application of the colored clear coating (B), but is preferably such that the P-polymer is generally 0.01–100% by weight, preferably 0.02–20% by weight, particularly preferably 0.03–10% by weight based on the total of the solid contents of the two components and the other ordinary resin for coating (the total of the crosslinkable functional group-containing resin and the crosslinking agent) is generally 99.99–0% by weight, preferably 99.98–80% by weight, particularly preferably 99.97–90% by weight.

According to the present method, the colored clear coating (B) is applied onto the cured film of the metallic coating (A) formed on a substrate (e.g. a body panel of automobile). (The substrate is obtained by applying a primer on a metal or plastic sheet and then applying, as necessary, an intermediate coating thereon.) The colored clear coating (B) can be applied by a per se known method such as electrostatic coating, spray coating or the like so as to give a coating film having an "as cured" thickness of generally about 5–100 μm, preferably about 20–80 μm. The coating film can be cured at a temperature of about 100°–160° C.

As described above, in the present method for formation of a multi-layer coating film, onto a metallic coating film having, on the surface, a continuous aluminum plane formed by parallel orientation of leafing type aluminum flake is applied a colored clear coating (B) containing a phosphoric acid group- and hydroxyl group-containing polymer, whereby a multi-layer coating film significantly improved in interlayer adhesivity between the metallic coating film and the film of the colored clear coating (B) can be formed without any deterioration in the effects provided by leafing type aluminum flake, i.e. the film surface of high density, strong brightness and flip-flop feeling and chrome plating-like finish.

Such a multi-layer coating film has good heat insulation as compared with other coating films. Therefore, in an automobile coated with the present method, the inside temperature is less affected by atmospheric conditions.

The present invention is described more specifically below by way of Examples.

1. PRODUCTION OF SAMPLES

1) Material to be Coated

Onto a zinc phosphate-treated dull-finish steel plate (thickness: 0.8 mm) was applied a thermosetting epoxy resin type cationic electrocoating [Elecron 9600 (trade name), a product of Kansai Paint Co., Ltd.] so as to form a film of about 20μ in thickness as cured; the film was cured at 170° C. for 30 minutes; thereonto was applied, by air spraying, an intermediate coating for automobile (an organic solvent type coating containing, as bases, a thermosetting polyester resin and a melamine resin) [TP-37 Primer-Surfacer (trade name), a product of Kansai Paint Co., Ltd.)] so as to form a film of about 25μ in thickness as cured; and the resulting material was allowed to stand at room temperature for 3 minutes. The thus-obtained material was used as a material to be coated.

2) Metallic Coatings (A)

(A-1)

In a mixed organic solvent (xylene/toluene=1/1 by weight) were dispersed or dissolved 65 parts by weight of a polyester resin (*1), 35 parts by weight of a melamine resin (*2) and 10 parts by weight of a leafing type aluminum flake (*3); and the mixture was subjected to viscosity adjustment so as to have a viscosity of 13 seconds as measured by Ford Cup No. 4 (20° C. ).

*1: A polyester resin of phthalic anhydride-hexahydrophthalic anhydride type, having a number-average molecular weight of about 3,500, a hydroxyl value of 82 mg KOH/g and an acid value of 8 mg KOH/g.

*2: UBAN 28-60 (trade name), a product of Mitsui Toatsu Chemicals, Inc.

*3: Hi Print 60T (trade name), a product of Toyo Aluminum K.K. having a lengthwise direction size of 4.4 μm and a thickness of 0.2 μm.

(A-2) (For Comparison)

In a mixed organic solvent (xylene/toluene=1/1 by weight) were dispersed or dissolved 65 parts by weight of a polyester resin (*1), 35 parts by weight of a melamine resin (*2) and 10 parts by weight of a non-leafing type aluminum flake (*4); and the mixture was subjected to viscosity adjustment so as to have a viscosity of 13 seconds as measured by Ford Cup No. 4 (20° C.)

*4: ALUMIPASTE 7640 NS (trade name), a product of Toyo Aluminum K.K. having a lengthwise direction size of 17 μm and a thickness of 0.5 μm.

3) Colored Clear Coatings (B)

(B-1)

In a hydrocarbon type solvent [SWASOL 1000 (trade name), a product of Cosmo Oil Co., Ltd.] were dispersed or dissolved 50 parts by weight of a carboxyl group-containing acrylic resin (*5), 50 parts by weight of an epoxy group-containing acrylic resin (*6), 0.03 part by weight of a P-polymer (a) (*7), 1 part by weight of a perylene type blue pigment (a product of Bayer), 1 part by weight of an ultraviolet absorber [TINUBIN 900 (trade name), a product of Ciba-Geigy], 2 parts by weight of a 1/1 (in equivalent) mixture of tetrabutylammonium bromide and monobutyl phosphate, and 0.1 part by weight of a surface conditioner [BYK 300 (trade name), a product of BYK Chemie]. The resulting mixture was subjected to viscosity adjustment so as to have a viscosity of 13 seconds as measured by Ford Cup No. 4 at 20° C.

*5: A polymer obtained by copolymerizing 20% by weight of methanol half ester of maleic anhydride, 20% by weight of 4-hydroxybutyl acrylate, 40% by weight of n-butyl acrylate and 20% by weight of styrene, which has a number-average molecular weight of 3,500, an acid value of 86 mg KOH/g and a hydroxyl value of 78 mg KOH/g.

*6: A polymer obtained by copolymerizing 30% by weight of gycidyl methacrylate, 20% by weight of 4-hydroxybutyl acrylate, 30% by weight of n-butyl acrylate and 20% by weight of styrene, which has a number-average molecular weight of 3,000, an epoxy group content of 2.12 mM/g and a hydroxyl value of 78 mg KOH/g.

*7: A mixture having a solid content of 50% by weight produced by mixing, into an organic solvent (xylene), a phosphoric acid group- and hydroxyl group-containing resin (acid value based on phosphoric acid: 63 mg KOH/g, hydroxyl value: 60 mg KOH/g, number-average molecular weight: 11,500) obtained by polymerizing, in a mixed solvent (xylene/butanol=1/1 by weight), 15 parts by weight of acid-phosphoxyethyl methacrylate, 14 parts by weight of 2-hydroxyethyl methacrylate, 20 parts by weight of methyl methacrylate, 21 parts by weight of butyl methacrylate and 30 parts by weight of 2-ethylhexyl methacrylate.

(B-2)

In a hydrocarbon type solvent [SWASOL 1000 (trade name), a product of Cosmo Oil Co., Ltd.] were dispersed or dissolved 60 parts by weight of a carboxyl group-containing acrylic resin (*8), 40 parts by weight of an epoxy group-containing acrylic resin (*6), 0.08 part by weight of a P-polymer (b) (*9), 1 part by weight of a perylene type blue pigment (a product of Bayer), 0.5 part by weight of Silver Pearl (a product of Merck), 1 part by weight of an ultraviolet absorber [TINUBIN 900 (trade name), a product of Ciba-Geigy], 2 parts by weight of a 1/1 (in equivalent) mixture of tetrabutylammonium bromide and monobutyl phosphate, and 0.1 part by weight of a surface conditioner [BYK 300 (trade name), a product of BYK Chemie]. The resulting mixture was subjected to viscosity adjustment so as to have a viscosity of 13 seconds as measured by Ford Cup No. 4 at 20° C.

*8: A polymer obtained by copolymerizing 20% by weight of methanol half ester of maleic anhydride, 16% by weight of 2-hydroxyethyl acrylate, 44% by weight of n-butyl acrylate and 20% by weight of styrene, which has a number-average molecular weight of 3,500, an acid value of 86 mg KOH/g and a hydroxyl value of 78 mg KOH/g.

*9: A mixture having a solid content of 50% by weight produced by mixing, into an organic solvent (xylene), a phosphoric acid group- and hydroxyl group-containing resin (acid value based on phosphoric acid: 126 mg KOH/g, hydroxyl value: 72 mg KOH/g, number-average molecular weight: 13,000) obtained by polymerizing, in a mixed solvent (xylene/butanol=1/1 by weight), 30 parts by weight of acid-phosphoxyethyl methacrylate, 15 parts by weight of 2-hydroxyethyl acrylate, 20 parts by weight of methyl methacrylate, 5 parts by weight of butyl methacrylate and 30 parts by weight of 2-ethylhexyl methacrylate.

(B-3)

In a hydrocarbon type solvent [SWASOL 1000 (trade name), a product of Cosmo Oil Co., Ltd.] were dispersed or dissolved 60 parts by weight of a carboxyl group-containing acrylic resin (*8), 40 parts by weight of an epoxy group-containing acrylic resin (*6), 0.08 part by weight of a P-polymer (c) (*10), 1 part by weight of a perylene type blue pigment (a product of Bayer), 1 part by weight of an ultraviolet absorber [TINUBIN 900 (trade name), a product of Ciba-Geigy], 2 parts by weight of a 1/1 (in equivalent) mixture of tetrabutylammonium bromide and monobutyl phosphate, and 0.1 part by weight of a surface conditioner [BYK 300 (trade name), a product of BYK Chemie]. The resulting mixture was subjected to viscosity adjustment so as to have a viscosity of 13 seconds as measured by Ford Cup No. 4 at 20° C.

*10: A mixture having a solid content of 50% by weight produced by mixing, into an organic solvent (xylene), a phosphoric acid group-, hydroxyl group- and alkoxymethylamide group-containing resin (acid value based on phosphoric acid: 21 mg KOH/g, hydroxyl value: 72 mg KOH/g, number-average molecular weight: 11,000) obtained by polymerizing, in a mixed solvent (xylene/butanol=1/1 by weight), 5 parts by weight of acid-phosphoxyethyl methacrylate, 15 parts by weight of 2-hydroxyethyl methacrylate, 15 parts by weight of N-butoxymethylacrylamide, 20 parts by weight of styrene, 15 parts by weight of butyl methacrylate and 30 parts by weight of 2-ethylhexyl methacrylate.

(B-4) (For Comparison)

In a hydrocarbon type solvent [SWASOL 1000 (trade name), a product of Cosmo Oil Co., Ltd.] were dispersed or dissolved 60 parts by weight of a carboxyl group-containing acrylic resin (*8), 40 parts by weight of an epoxy group-containing acrylic resin (*6), 0.03 part by weight of a P-polymer (d) (*11), 1 part by weight of a perylene type blue pigment (a product of Bayer), 1 part by weight of an ultraviolet absorber [TINUBIN 900 (trade name), a product of Ciba-Geigy], 2 parts by weight of a 1/1 (in equivalent) mixture of tetrabutylammonium bromide and monobutyl phosphate, and 0.1 part by weight of a surface conditioner [BYK 300 (trade name), a product of BYK Chemie]. The resulting mixture was subjected to viscosity adjustment so as to have a viscosity of 13 seconds as measured by Ford Cup No. 4 at 20° C.

*11: A mixture having a solid content of 50% by weight produced by mixing, into an organic solvent (xylene), a butoxymethyl acrylamide group-containing resin (number-average molecular weight: 11,500) obtained by polymerizing, in butyl cellosolve, 20 parts by weight of N-butoxymethylacrylamide, 20 parts by weight of styrene, 30 parts by weight of butyl methacrylate and 30 parts by weight of 2-ethylhexyl methacrylate.

2. EXAMPLES AND COMPARATIVE EXAMPLES

Onto the uncured intermediate coating film of the above-mentioned material to be coated was applied the metallic coating (A-1) or (A-2) so as to form a film thereof having a thickness of 15 μm as cured, and the resulting material was allowed to stand at room temperature for 5 minutes. Then, the material was heated at 140° C. for 30 minutes to cure the intermediate coating film and the metallic coating film. Onto the metallic coating film was applied one of the colored clear coatings (B-1) to (B-4) so as to form a film thereof having a thickness of 35–40 μm as cured. The resulting material was allowed to stand at room temperature for 5 minutes and then heated at 140° C. for 30 minutes for curing.

Each of the thus-obtained multi-layer coating films was measured for properties. The results of measurement are shown in Table 1.

TABLE 1

| | Examples | | | Comp. Examples | | |
|---|---|---|---|---|---|---|
| | 1 | 2 | 3 | 1 | 2 | 3 |
| Metallic coating | (A-1) | (A-1) | (A-1) | (A-2) | (A-1) | (A-2) |
| Colored clear coating | (B-1) | (B-2) | (B-3) | (B-1) | (B-4) | (B-4) |
| Properties | | | | | | |
| Adhesivity(1) | ○ | ○ | ○ | ○ | x | x |
| L* (15)(2) | 33 | 42 | 39 | 65 | 33 | 35 |
| C* (15)(3) | 71 | 91 | 86 | 80 | 71 | 67 |
| Appearance(4) | ○ | ○ | ○ | x | ○ | x |

Notes for Table 1

(1): Adhesivity was tested by (a) producing cutlines in the multi-layer coating film with a cutter so that the cutter edge reached the dull-finish steel plate, to form 100 squares each of 1 mm×1 mm, (b) adhering a pressure-sensitive adhesive tape on the multi-layer coating film, (c) peeling the tape quickly, and (d) examining the extent of removal of coating film squares. "o" refers to no peeling (no removal) of any coating film square and "X" refers to peeling of 10 or more coating film squares.

(2): L* (15) refers to a L* value when the light-receiving angle at front is 15°.

(3): C* (15) refers to a saturation when the light-receiving angle at front is 15°.

(4): Appearance refers to a candy tone. "o" refers to a chrome plating-like finish in which the lightness is low but the saturation is very high and the color purity is high. "X" refers to a state in which the front is bright, the saturation is high, and there is an ordinary silver metallic tone or generation of mottling by strike in.

What is claimed is:

1. A method for forming a multi-layer coating film, which comprises applying a colored clear coating (B) containing a color pigment and/or a glittering material, on a film of an aluminum flake-containing metallic coating (A), wherein the colored clear coating (B) comprises a polymer formed from an unsaturated monomer having a phosphoric acid group represented by —O—PO(OH)($R_1$), wherein $R_1$is a hydroxyl group, a phenyl group or a $C_{1-20}$ alkyl group, and having a hydroxyl group-containing unsaturated monomer.

2. A method according to claim 1, wherein the phosphoric acid group-containing unsaturated monomer is selected from the group consisting of an acid-phosphoxy-$C_{1-20}$ alkyl (meth)acrylate and an equimolar adduct of glycidyl (meth) acrylate and a mono-$C_{1-20}$ alkyl phosphate.

3. A method according to claim 2, wherein the phosphoric acid group-containing unsaturated monomer is an acid-phosphoxy-$C_{2-10}$ alkyl (meth)acrylate.

4. A method according to claim 1, wherein the hydroxyl group-containing unsaturated monomer is a $C_{2-20}$ hydroxy-alkyl ester of (meth)acrylic acid.

5. A method according to claim 4, wherein the hydroxyl group-containing unsaturated monomer is a $C_{2-10}$ hydroxy-alkyl ester of (meth)acrylic acid.

6. A method according to claim 1, wherein the polymer is obtained by copolymerizing the phosphoric acid group-containing unsaturated monomer, the hydroxyl group-containing unsaturated monomer and, optionally, an unsaturated monomer selected from an N-alkoxymethylamide group-containing unsaturated monomer and other unsaturated monomer.

7. A method according to claim 1, wherein the polymer has a hydroxyl value of 5–150 mg KOH/g.

8. A method according to claim 1, wherein the polymer has an acid value based on the phosphoric acid group, of 10–150 mg KOH/g.

9. A method according to claim 1, wherein the polymer has a number-average molecular weight of 1,000–100,000.

10. A method according to claim 1, wherein the colored clear coating (B) contains the polymer in a concentration, based on solid content, of 20–80% by weight.

11. A method according to claim 1, wherein the colored clear coating (B) further contains a second coating resin.

12. A method according to claim 11, wherein the colored clear coating (B) contains the polymer and the second coating resin in amounts of 0.02–20% by weight and 99.98–80% by weight, respectively, based on the total solid content of the polymer and the second coating resin.

13. A method according to claim 1, wherein the film of the colored clear coating (B) has a thickness of 5–100 μm as cured.

14. A method according to claim 1, wherein the film of the aluminum flake-containing metallic coating (A) is formed by applying a primer on a substrate, heat-curing the resulting primer film, optionally applying an intermediate coating and heating the resulting intermediate coating film if applied, and applying the metallic coating (A) thereon.

15. A coated article obtained by a method of claim 1.

* * * * *